3,196,302
SEALED ELECTRIC MOTOR
Robert Dechet, Boulogne-sur-Seine, France, assignor to Cie Electro-Mecanique, Paris, France, a body corporate of France
Filed Mar. 12, 1962, Ser. No. 178,879
Claims priority, application France, Mar. 31, 1961, 857,499, Patent 1,293,163
1 Claim. (Cl. 310—104)

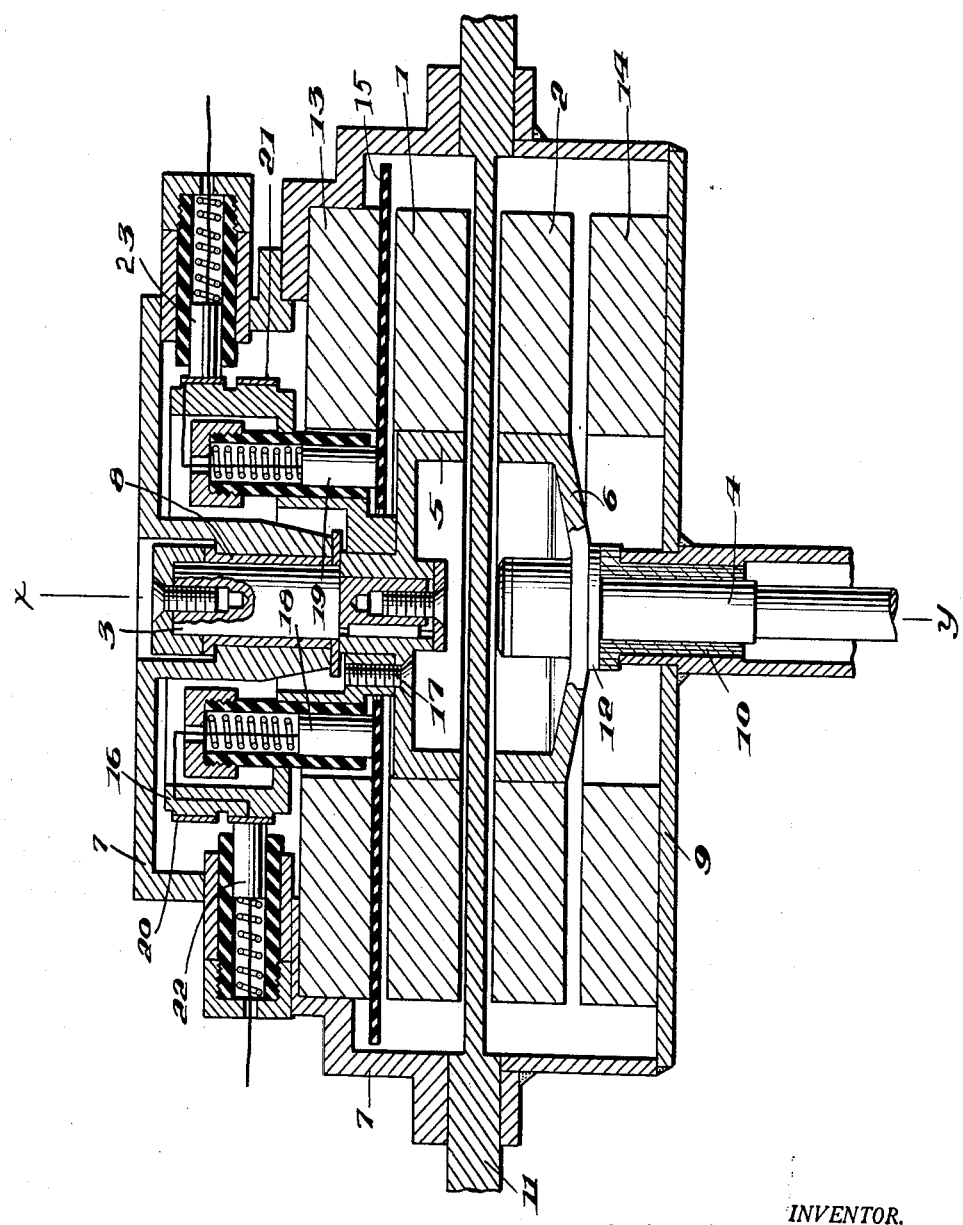

The present invention relates to electric motors and in particular to those of the sealed type operating on direct current in which the inductor field is parallel to the axis of rotation and is produced by a rotating inductor and the stator member is comprised of a thin disc of insulating material on which is produced a flat winding engaged by brushes which rotate with the inductor.

A motor construction of this type is known wherein the various components are mounted in two casings hermetically separated from each other by means of a fully non-magnetic partition, in the immediate vicinity of which the stator is arranged, the latter being constituted by a thin disk of insulating material carrying on opposite faces thereof a flat coil with laminated conductors. Each casing contains one of the inductors mounted on a shaft, these shafts being separated by the partition, and their axes being aligned.

In such two-part motors, the various electric and magnetic components can be selected and distributed in such manner that those grouped within one casing part can withstand the action of some fluid such as water in which this part of the motor must be present.

The known construction for such a motor has a major disadvantage in that the stator disk and coil thereon is placed in the immediate vicinity of the partition member between the two casing parts and, in fact, is secured directly to it. The electrical losses in the conductors of the stator coil will then cause heating not only of the coil but also of the partition whose performance may, owing to this fact, leave much to be desired. In accordance with the present improvement, this disadvantage is overcome by effecting a spacial separation between the stator disk and the sealing partition, these two parts being separated from each other by all or part of that rotating inductor which is mounted within the casing containing the stator.

One practical and non-limiting embodiment of the invention will now be described and its construction is illustrated in the accompanying drawing, the single figure of which represents the improved complete motor in section along the axis of rotation.

With reference now to the drawing, the motor includes a pair of rotatable inductor members 1, 2 having a smooth torodial configuration and made of a hard magnetic material, for example, ferrite, which are magnetized in an axial direction to establish a ring of circumferentially spaced magnetic poles alternating in polarity. Inductor member 1 is secured fast to a rim 5 of non-magnetic material which in turn is secured fast to a shaft 3, and the latter is mounted for rotation in a bearing 8. All of these members are located within one casing 7. In a similar manner, inductor member 2 is secured fast to a rim 6 of non-magnetic material which in turn is secured fast to a shaft 4, and the latter is mounted for rotation in bearing 10. All of these members are located within the other casing 9.

These two casings 7 and 9, and hence, the shafts 3, 4 and inductors 1, 2, are entirely separated each from the other by means of a partition member 11 of non-magnetic material. The two casings are, of course, centered so that the axes of rotation of the shafts 3, 4 coincide along a straight line X–Y, and can be held in that relationship by any suitable securing means, or simply by the magnetic attraction that exists between them. The gap between inductors 1 and 2 may be adjusted by means of a washer 12 of the desired thickness placed on shaft 4.

Yoke 13 of soft ferrite is secured, for example, by gluing within casing 7, and a similar yoke 14 is secured within casing 9. This arrangement permits one, in known manner, to obtain economically the required compensation for the thrusts and attractions likely to be exerted axially between the two rotating parts.

In order that the inductor 1 may separate the stator disk 15 from the partition member 11, this is located in the gap between inductor 1 and yoke 13. Stator disk 15 is relatively thin, it carries on both sides thereof a flat coil composed of laminated conductors, and it is attached to the face of yoke 13 by gluing.

A rim 16 mounted on the hub portion of rim 5 with which it is made integral by means of screws 17, carries rotating brushes 18, 19 and collector rings 20, 21. Brushes 18 and 19 are electrically connected respectively to collector rings 21, 20. The latter are brushed by fixed brushes 22, 23 mounted on casing 7 and serve to bring current, from an external source not shown, to rings 20, 21 and thence from the latter to brushes 19, 18 and thence to the bare coils on the stator disk on which they slide.

The fact that the stator element is relocated from the sealing partition 11 in accordance with the invention facilitates cooling of the stator coils on the one hand, and on the other hand, effects a considerable reduction in the heating of the partition.

In conclusion, while one practical embodiment of the invention has been described, various modifications of the construction and arrangement of component parts such as the profile of the sealing partition, the mode of assembly, arrangment of the inductors, etc., may be made, however, without departing from the spirit and scope of the invention as defined in the appended claim.

I claim:

In a sealed direct current electric motor, the combination comprising first and second casings mounted on opposite sides respectively of a relatively thin planar partition member, first and second annular inductor members of magnetic material each establishing a ring of circumferentially spaced magnetic poles alternating in polarity and located respectively within said first and second casing and adjacent opposite sides of said partition member, means mounting said first and second inductor members for rotation about a common axis normal to the plane of said partition member, an annular yoke member of magnetic material supported in a stationary manner in said first casing concentric with and adjacent that side of said first inductor member opposite to the side which faces said partition member, a disc type stator member having a flat winding thereon and which is secured to said yoke member and located between said yoke member and said first inductor member and concentrically therewith, brush means within the first casing which engage the winding on said stator member, said brush means being mounted for rotation with said first inductor member and a second annular yoke member of magnetic material supported in a stationary manner in said second casing concentric with and adjacent that side of said second inductor member opposite to that side which faces said partition member.

References Cited by the Examiner
UNITED STATES PATENTS

| | | | |
|---|---|---|---|
| 2,481,172 | 9/49 | Staggs | 310—104 |
| 2,511,698 | 6/50 | Dickey | 310—98 |
| 2,534,520 | 12/50 | Katcher | 310—268 X |
| 2,680,203 | 6/54 | Zozulin | 310—94 |
| 2,700,343 | 1/55 | Pezzillo | 310—268 |
| 2,707,863 | 5/55 | Rhodes | 310—98 |
| 2,782,721 | 2/57 | White | 310—268 X |
| 3,091,711 | 5/63 | Henry-Baudot | 310—268 |
| 3,144,573 | 8/64 | Bergey | 310—104 |
| 3,144,574 | 8/64 | Henry-Baudot | 310—268 |

ORIS L. RADER, *Primary Examiner.*

MILTON O. HIRSHFIELD, *Examiner.*